(12) United States Patent
Schneller

(10) Patent No.: US 7,007,999 B1
(45) Date of Patent: Mar. 7, 2006

(54) UTILITY VEHICLE WINDSCREEN SYSTEM

(76) Inventor: Daniel P. Schneller, 19111 366th Ave., St. Lawrence, SD (US) 57373

( * ) Notice: Subject to any disclaimer, the term of this patent is extended or adjusted under 35 U.S.C. 154(b) by 78 days.

(21) Appl. No.: 11/012,043

(22) Filed: Dec. 13, 2004

(51) Int. Cl.
*B60J 1/02* (2006.01)
(52) U.S. Cl. ............ 296/90; 296/96.21; 296/77.1
(58) Field of Classification Search ............ 296/84.1, 296/90, 96.21, 77.1, 79, 80, 180.1; 160/239, 160/268.1, 269, 327, 382, 377, DIG. 1, DIG. 2
See application file for complete search history.

(56) References Cited

U.S. PATENT DOCUMENTS

| | | | |
|---|---|---|---|
| 1,339,527 A | | 5/1920 | Sperling et al. |
| 1,798,524 A | * | 3/1931 | Di Palma ................. 296/95.1 |
| 2,717,036 A | * | 9/1955 | Harris ................. 160/DIG. 2 |
| 3,237,778 A | * | 3/1966 | Hoodis ................. 160/327 |
| 3,859,152 A | | 1/1975 | Hobbs ................. 156/88 |
| 4,336,964 A | | 6/1982 | Pivar ................. 296/78 |
| 4,773,695 A | | 9/1988 | Jones et al. ................. 296/77.1 |
| 5,110,174 A | | 5/1992 | Andree ................. 296/77.1 |
| 5,385,380 A | | 1/1995 | Heavner ................. 296/84.1 |
| RE35,757 E | | 3/1998 | Heavner ................. 296/84.1 |
| 5,954,385 A | | 9/1999 | Moore et al. ................. 296/96.2 |
| 6,007,134 A | * | 12/1999 | Weston ................. 296/83 |
| 6,206,447 B1 | | 3/2001 | Nation ................. 296/77.1 |
| 6,224,073 B1 | | 5/2001 | Au ................. 280/47.38 |
| 6,293,616 B1 | | 9/2001 | Williams et al. ................. 296/203.01 |
| 6,416,108 B1 | | 7/2002 | Elswick ................. 296/96.21 |
| 6,530,617 B1 | | 3/2003 | McElwee et al. ................. 296/77.1 |
| RE38,272 E | * | 10/2003 | Nation ................. 296/77.1 |
| 6,663,158 B1 | | 12/2003 | Showalter ................. 296/96.21 |
| 2002/0084669 A1 | | 7/2002 | Goodstein ................. 296/77.1 |

OTHER PUBLICATIONS

Winter Front & Bug Screen, Dec. 6, 2004, www.tonnocover.com, Website Printout, 6 pages.

* cited by examiner

Primary Examiner—Jason Morrow

(57) ABSTRACT

A utility vehicle windscreen system for providing protection from debris to a utility vehicle driver while allowing airflow into the cab area. The utility vehicle windscreen system includes a windscreen and a plurality of brackets. The brackets are attached to the front portion of the roll cage of the utility vehicle and the windscreen is attached to the brackets to provide protection to the driver and passengers from debris.

18 Claims, 6 Drawing Sheets

UTILITY VEHICLE WINDSCREEN SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to utility vehicles and more specifically it relates to a utility vehicle windscreen system for providing protection from debris to a utility vehicle driver while allowing airflow into the cab area.

2. Description of the Related Art

Utility vehicles (e.g. POLARIS RANGER) are becoming increasingly popular. An exemplary utility vehicle is illustrated in FIG. 2 of the drawings which is comprised of a body, a cab area where the driver is seated and a roll cage that surrounds the cab area. One of the problems with conventional utility vehicles is that they do not protect the driver and passengers from debris (e.g. bugs, rocks, branches).

Cab enclosures and lightweight transparent windshields have been developed that can be attached to a roll cage to protect the driver and passengers. These devices are typically comprised of a transparent plastic material that is non-permeable. However, these transparent devices reduce the passage of air into the cab area. Reduced airflow into the cab area, dust and debris is more prone to collect within the cab area. In addition, during warm and hot weather conditions, reduced airflow into the cab area can be uncomfortable for the driver and passengers.

While utility vehicles are suitable for the particular purpose to which they address, they are not as suitable for providing protection from debris to a driver while allowing airflow into the cab area. Conventional utility vehicles do not provide adequate protection for drivers and passengers.

In these respects, the utility vehicle windscreen system according to the present invention substantially departs from the conventional concepts and designs of the prior art, and in so doing provides an apparatus primarily developed for the purpose of providing protection from debris to a utility vehicle driver while allowing airflow into the cab area.

BRIEF SUMMARY OF THE INVENTION

In view of the foregoing disadvantages inherent in the known types of utility vehicles now present in the prior art, the present invention provides a new utility vehicle windscreen system construction wherein the same can be utilized for providing protection from debris to a utility vehicle driver while allowing airflow into the cab area.

To attain this, the present invention generally comprises a windscreen and a plurality of brackets. The brackets are attached to the front portion of the roll cage of the utility vehicle and the windscreen is attached to the brackets to provide protection to the driver and passengers from debris.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a utility vehicle windscreen system that will overcome the shortcomings of the prior art devices.

A second object is to provide a utility vehicle windscreen system for providing protection from debris to a utility vehicle driver while allowing airflow into the cab area.

Another object is to provide a utility vehicle windscreen system that reduces the accumulation of dust and debris within the cab area while protecting the driver and passengers.

An additional object is to provide a utility vehicle windscreen system that is easy to install and remove with most conventional utility vehicles.

A further object is to provide a utility vehicle windscreen system that is easy to clean and that is capable of being rolled up into a compact storage position.

Another object is to provide a utility vehicle windscreen system that does not interfere with the vision of the driver or the appearance of the utility vehicle.

A further object is to provide a utility vehicle windscreen system that does not need to be removed when the utility vehicle is towed at high speeds upon a trailer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
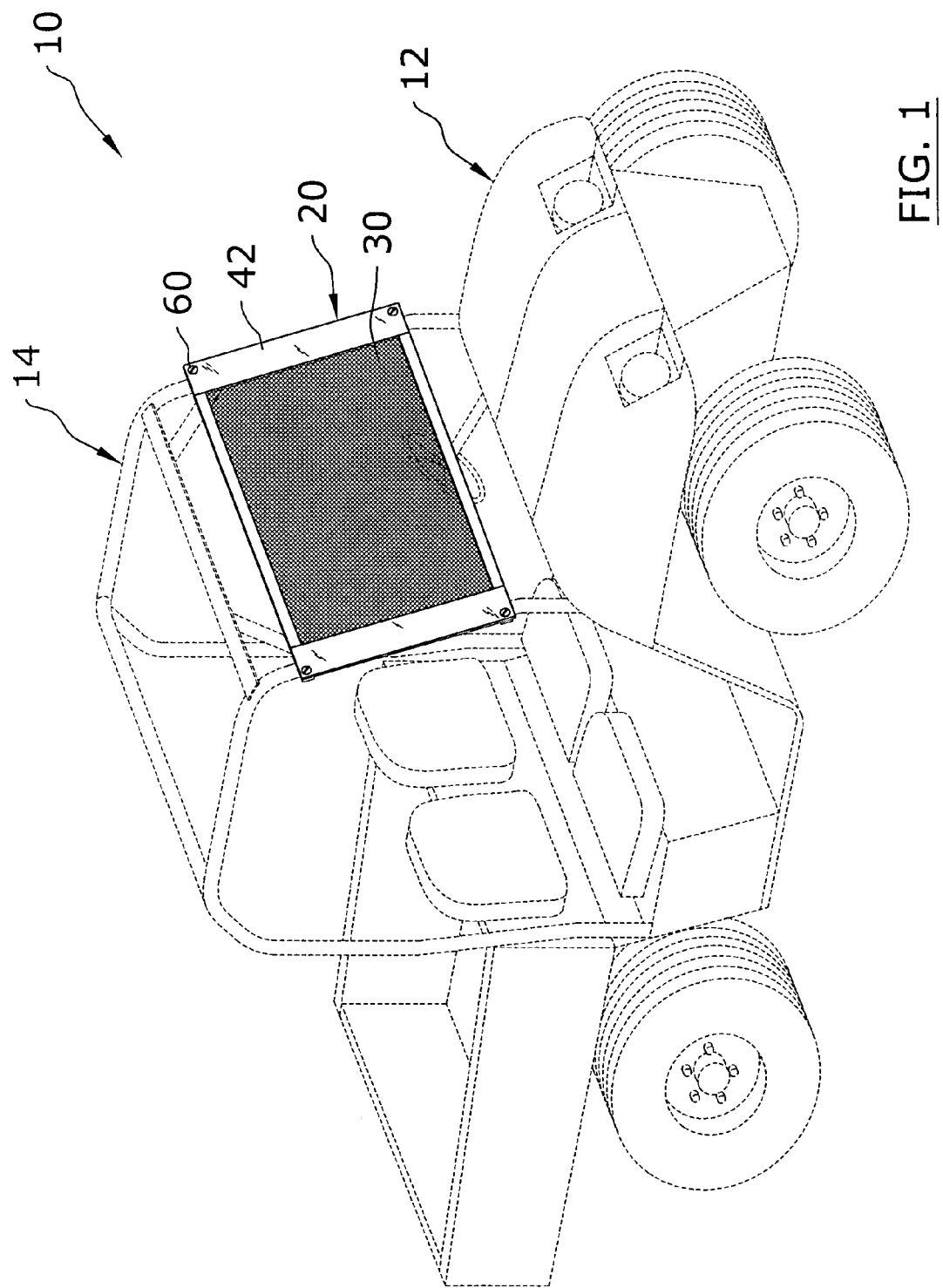
FIG. 1 is an upper perspective view of the present invention attached to a roll cage of a utility vehicle.

Turning now descriptively to the drawings, in which similar reference characters denote similar elements throughout the several views, FIGS. 1 through 6 illustrate a utility vehicle windscreen system 10, which comprises a windscreen 20 and a plurality of brackets 50. The brackets 50 are attached to the front portion of the roll cage 14 of the utility vehicle 12 and the windscreen 20 is attached to the brackets 50 to provide protection to the driver and passengers from debris.

B. Brackets

Figure 2:
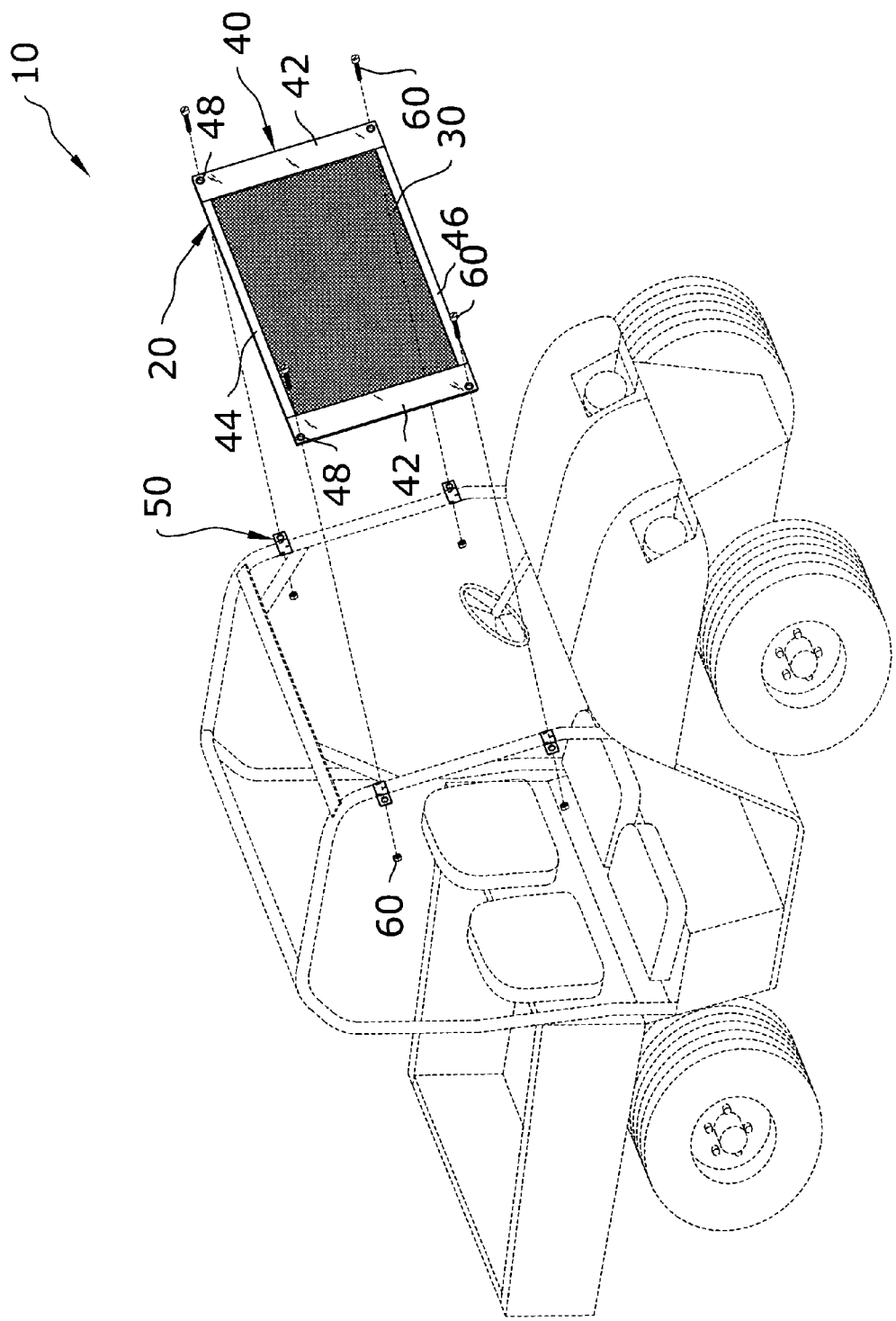
FIG. 2 is an exploded upper perspective view of the present invention with respect to a roll cage of a utility vehicle.

The plurality of brackets 50 are attachable to a pair of front posts of a roll cage 14 of a utility vehicle 12 as best illustrated in FIG. 2 of the drawings. As further shown in FIG. 2 of the drawings, there are preferably four brackets 50 attached to roll cage 14 for retaining each of the four corners of the windscreen 20, however more or less brackets 50 may be utilized with the present invention.

Figure 3:
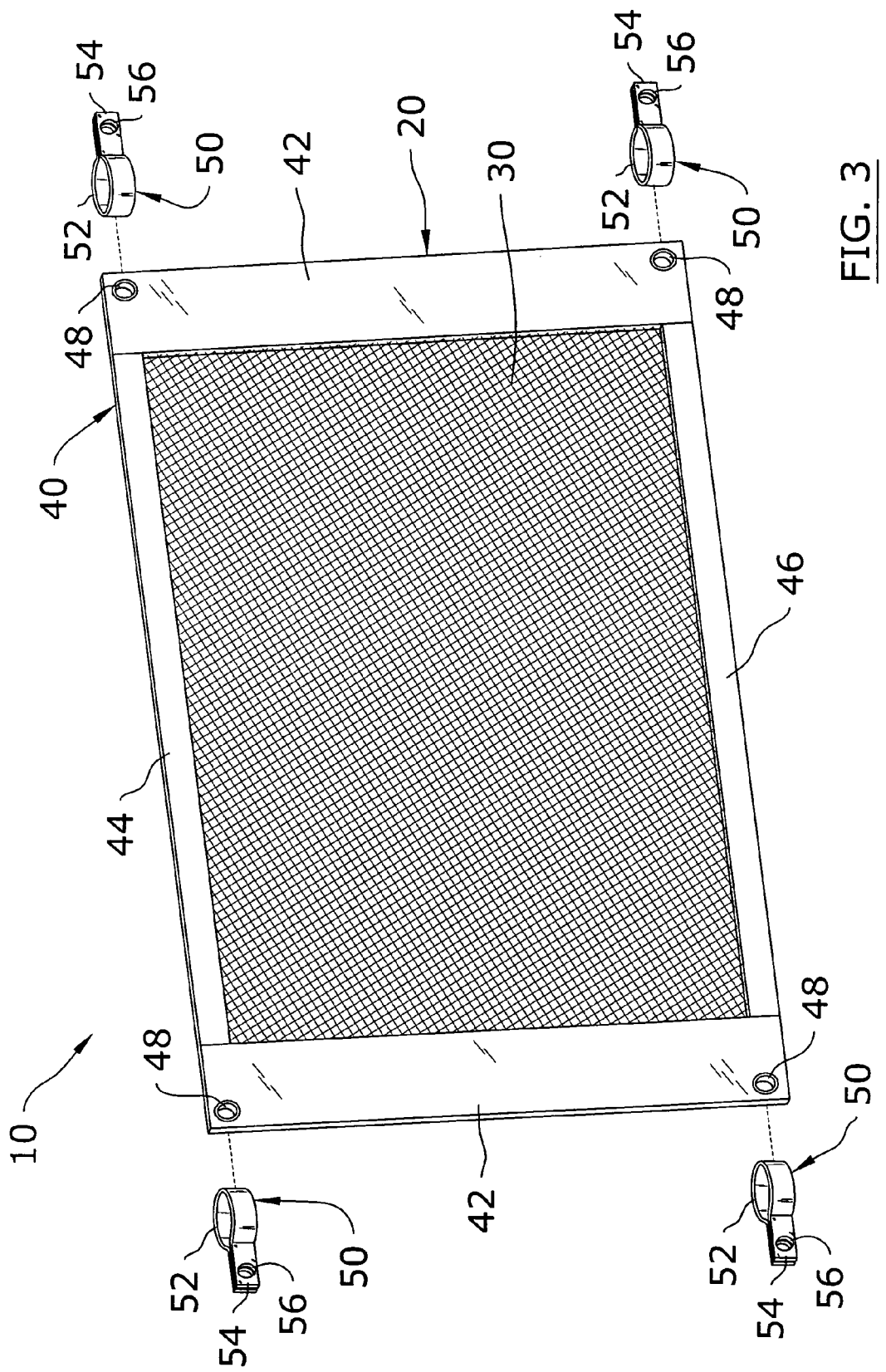
FIG. 3 is an upper perspective view of the present invention.
Figure 4:
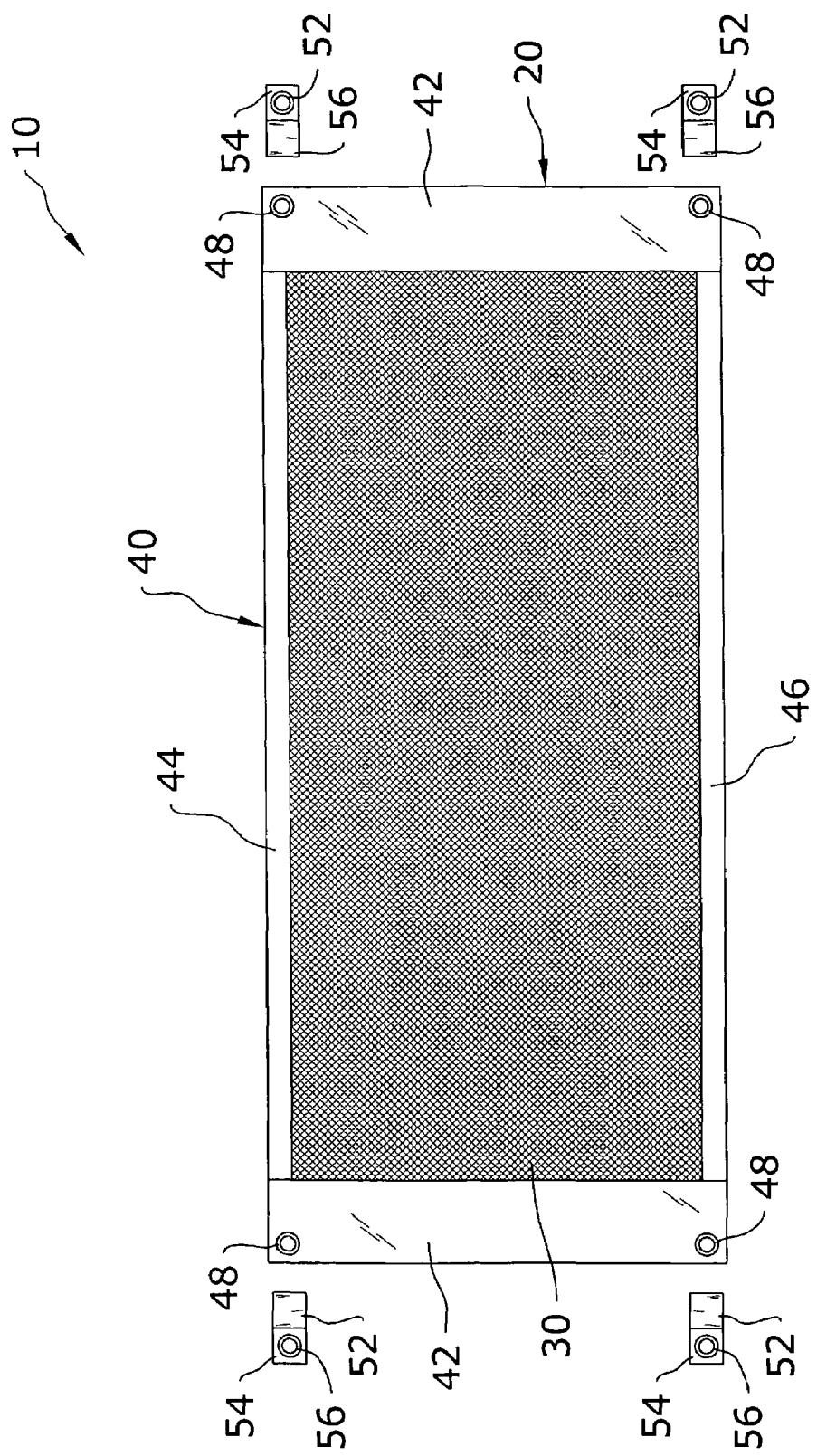
FIG. 4 is a front view of the present invention.

Each of the plurality of brackets 50 are preferably comprised of a cuff-like structure that has a loop portion 52 and an extended portion 54 as best illustrated in FIG. 3 of the drawings. The loop portion 52 is capable of surrounding a front post of the roll cage 14 as shown in FIG. 2 of the drawings.

The extended portion 54 extends from the loop portion 52 and extends outwardly from the roll cage 14 as further shown in FIG. 2 of the drawings. At least one aperture 56 extends through extended portion 54 for receiving a fastener 60 as best illustrated in FIG. 3 of the drawings. A fastener 60 extending through the aperture 56 within each bracket 50 also provides for tightening of the bracket 50 upon the front post of the roll cage 14. Other bracket structures may be utilized to secure the windscreen 20 to the roll cage 14 of the utility vehicle 12.

C. Windscreen

The windscreen 20 includes a screen member 30 that allows air to pass through and into a cab area of a utility vehicle 12. The screen member 30 may be comprised of an aluminum screen or similar screen structure that allows for the passage of air into the cab area without significantly obstructing the vision of the driver and passengers. The windscreen 20 may be comprised of various other materials such as but not limited to fiberglass and nylon. The windscreen 20 is preferably comprised of an elongated rectangular structure as shown in FIGS. 1 through 3 of the drawings. The windscreen 20 is attachable to the plurality of brackets 50 using a plurality of fasteners 60 (e.g. bolts, hook and loop fasteners).

The length of the windscreen 20 is approximately equal to a width of a roll cage 14 and the width of the windscreen 20 is less than a height of a front opening of a roll cage 14 as shown in FIG. 1 of the drawings. The length of the windscreen 20 preferably extends beyond the width of the roll cage 14 to provide additional strength for the windscreen 20 and for preventing debris from entering about the sides of the windscreen 20.

A frame 40 preferably surrounds the screen member 30 as best illustrated in FIG. 3 of the drawings. The frame 40 is preferably comprised of a flexible and resilient material such as but not limited to vinyl.

A plurality of eyelets 48 are preferably positioned within the corner portions of the frame 40 as best illustrated in FIG. 3 of the drawings. The eyelets 48 are preferably comprised of a metal or other strong material that is capable of distributing the force of the fasteners 60 through the frame 40 to prevent tearing of the frame 40. The plurality of eyelets 48 are capable of receiving a corresponding plurality of fasteners 60 (e.g. bolts) for removably securing the frame 40 to the brackets 50.

As best illustrated in FIG. 3 of the drawings, the frame 40 may be comprised of a pair of side portions 42, a lower portion 46 extending between the pair of side portions 42, and an upper portion 44 extending between the pair of side portions 42. The frame 40 may be comprised of a unitary structure or a plurality of members attached together.

D. Operation

In use, the user first positions the brackets 50 about the front posts of the roll cage 14 of the utility vehicle 12 as shown in FIG. 2 of the drawings. The user then positions the windscreen 20 upon the roll cage 14 and aligns the eyelets 48 with the apertures 56 within the brackets 50 as shown in FIG. 1 of the drawings. Fasteners such as, but not limited to, bolts are then inserted through the eyelets 48 and the apertures 56 thereafter being secured with a nut or similar structure. When the fasteners 60 are tightened this simultaneously tightens the brackets 50 upon the front posts of the roll cage 14. It is desirable that during the tightening of the fasteners 60 to rotate the brackets 50 upon the front posts to cause the windscreen 20 to be tightened into a taut state. A taut state is desired for the windscreen 20 to prevent flapping and movement during driving while also increasing the visibility through the screen. The user then may operate the vehicle as usual with the air passing through the screen member 30 while preventing debris from hitting the driver and passengers of the utility vehicle 12. The utility vehicle 12 may also be transported on a trailer or in a pickup without requiring removal of the windscreen 20.

Figure 5:
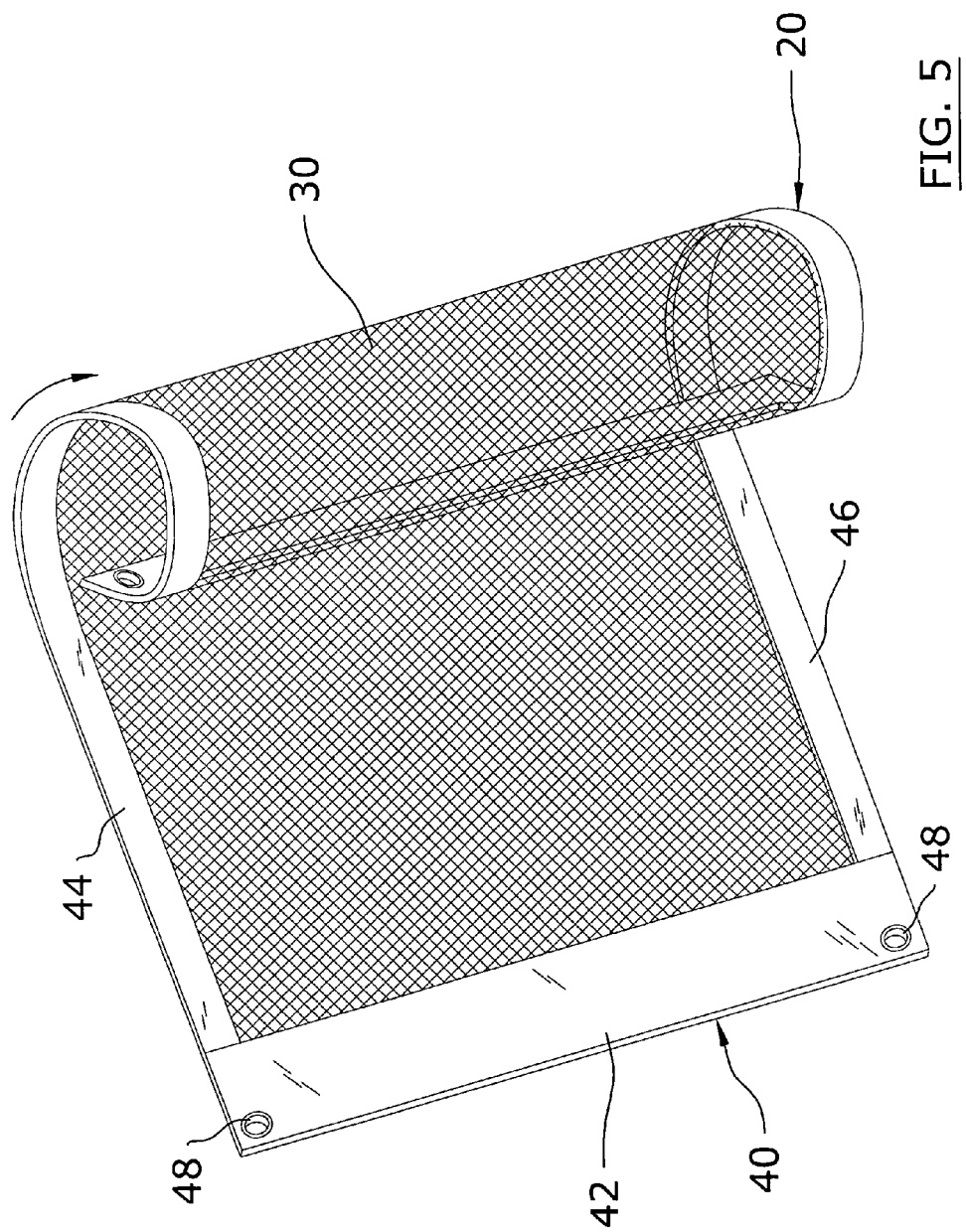
FIG. 5 is an upper perspective view of the present invention being rolled up into a storage position.
Figure 6:
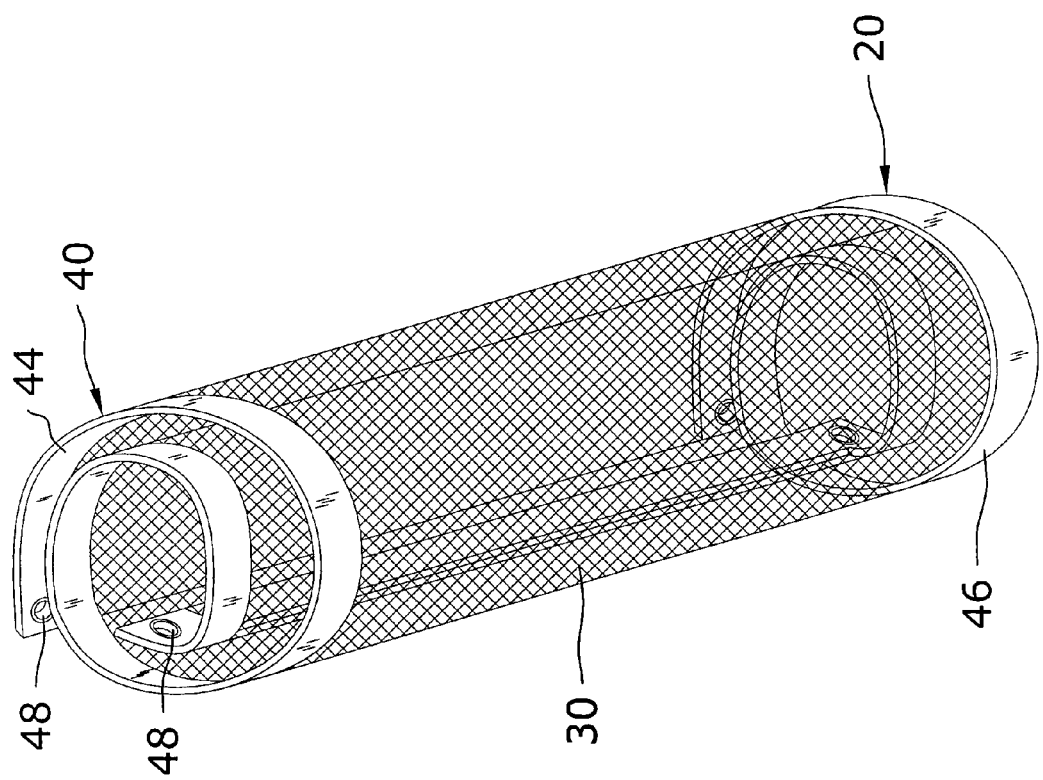
FIG. 6 is an upper perspective view of the windscreen rolled up into the storage position.

When the user desires to remove the windscreen 20, the fasteners 60 are removed and then the windscreen 20 may be removed from the roll cage 14. The windscreen 20 may then be rolled up into a compact storage structure as shown in FIGS. 5 and 6 of the drawings. The rolled up windscreen 20 may then be stored upon the utility vehicle 12 or other storage location.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A windscreen for a utility vehicle, comprising:
a plurality of brackets attachable to a front portion of a roll cage of a utility vehicle; and
a windscreen attachable to said plurality of brackets, wherein said windscreen includes a screen member that allows air to pass through and into a cab area of a utility vehicle, wherein said windscreen includes a frame surrounding said screen member and wherein said frame is comprised of a flexible and resilient material.

2. The windscreen for a utility vehicle of claim 1, wherein said plurality of brackets are comprised of four brackets.

3. The windscreen for a utility vehicle of claim 1, wherein said plurality of brackets are attachable to a pair of front posts of a roll cage.

4. The windscreen for a utility vehicle of claim 3, wherein each of said plurality of brackets are comprised of a loop portion that is capable of surrounding a front post of a roll cage, an extended portion that extends from the loop portion, and at least one aperture that extends through extended portion for receiving a fastener.

5. The windscreen for a utility vehicle of claim 1, wherein said frame surrounds an entire perimeter of said screen member.

6. The windscreen for a utility vehicle of claim 1, wherein said frame is comprised of a pair of side portions, a lower portion extending between said pair of side portions, and an upper portion extending between said pair of side portions.

7. The windscreen for a utility vehicle of claim 1, wherein said frame is comprised of a vinyl material.

8. The windscreen for a utility vehicle of claim 1, wherein said frame includes a plurality of eyelets that receive a corresponding plurality of fasteners for securing said frame to said brackets.

9. The windscreen for a utility vehicle of claim 8, wherein said eyelets are located in the corner portions of said frame.

10. The windscreen for a utility vehicle of claim 1, wherein said screen member is comprised of an aluminum screen.

11. The windscreen for a utility vehicle of claim 1, wherein said windscreen is comprised of an elongated rectangular structure.

12. The windscreen for a utility vehicle of claim 11, wherein a length of said windscreen is greater than a width of a roll cage of a utility vehicle.

13. The windscreen for a utility vehicle of claim 11, wherein a width of said windscreen is less than a height of a front opening of a roll cage of a utility vehicle.

14. A windscreen for a utility vehicle, comprising:
a plurality of brackets attachable to a pair of front posts of a roll cage of a utility vehicle;
a windscreen attachable to said plurality of brackets, wherein said windscreen includes a screen member that allows air to pass through and into a cab area of a utility vehicle;
wherein said windscreen is comprised of an elongated rectangular structure, wherein a length of said windscreen is greater than a width of a roll cage of a utility vehicle and wherein a width of said windscreen is less than a height of a front opening of a roll cage of a utility vehicle;
a frame surrounding said screen member and wherein said frame is comprised of a flexible and resilient material; and
a plurality of eyelets within the corner portions of said frame, wherein said plurality of eyelets are capable of receiving a corresponding plurality of fasteners for securing said frame to said brackets.

15. The windscreen for a utility vehicle of claim 14, wherein said plurality of brackets are comprised of four brackets.

16. The windscreen for a utility vehicle of claim 14, wherein each of said plurality of brackets are comprised of a loop portion that is capable of surrounding a front post of a roll cage, an extended portion that extends from the loop portion, and at least one aperture that extends through extended portion for receiving a fastener.

17. The windscreen for a utility vehicle of claim 14, wherein said frame is comprised of a pair of side portions, a lower portion extending between said pair of side portions, and an upper portion extending between said pair of side portions.

18. The windscreen for a utility vehicle of claim 14, wherein said frame is comprised of a vinyl material.

* * * * *